(No Model.)
J. MORIN.
GAGE FOR CROSSCUT SAWS.
No. 540,329. Patented June 4, 1895.
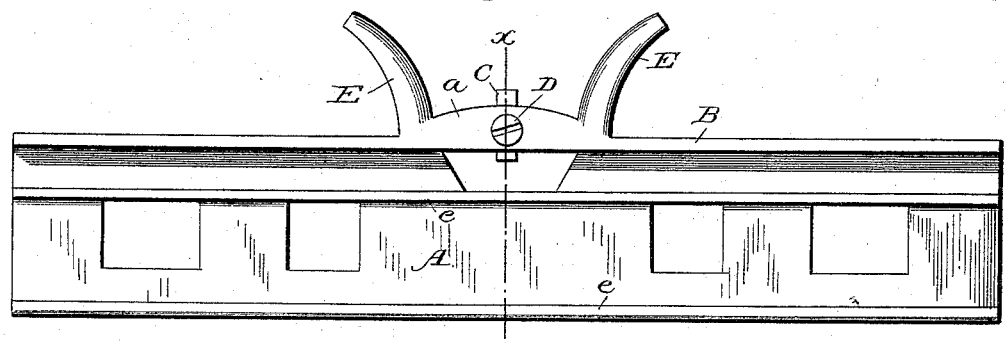
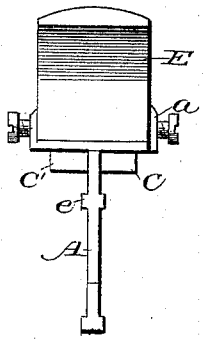
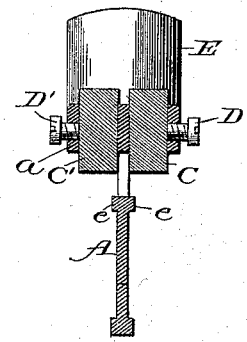
Witnesses
J. W. Reynolds
Chas. S. Hyer
Inventor
Joseph Morin
By John Wedderburn
Attorney

UNITED STATES PATENT OFFICE.

JOSEPH MORIN, OF MOUNT VERNON, WASHINGTON.

GAGE FOR CROSSCUT-SAWS.

SPECIFICATION forming part of Letters Patent No. 540,329, dated June 4, 1895.

Application filed March 23, 1894. Serial No. 504,793. (No model.)

*To all whom it may concern:*

Be it known that I, JOSEPH MORIN, a citizen of the United States, and a resident of Mount Vernon, in the county of Skagit and State of Washington, have invented certain new and useful Improvements in Gages for Crosscut-Saws; and I do hereby declare the following to be a full, clear, and exact description of the invention, such as will enable others skilled in the art to which it appertains to make and use the same.

My invention relates to improvements in gages for testing or gaging the raker teeth of cross-cut saws and aims to provide a tool simple, compact and efficient in its organization, which can be easily manipulated and used for the purposes for which it has been devised.

The improvement consists, essentially, of a tool or gage which is reversible, having two adjustable gage blocks, one on each side of a central plate having a cap or cross head to slide over the teeth.

The invention also consists of the novel features which hereinafter will be more fully described and claimed, and which are shown in the annexed drawings, in which—

Figure 1 is a side elevation of a gage embodying the invention. Fig. 2 is an end view of the tool. Fig. 3 is a cross-section on the line $x$ $x$ of Fig. 1.

The gage is composed of a plate A having a cap or cross head B at one edge, the plate being centrally disposed relative to the cap and projecting at right angles therefrom. The cap is thickened or raised at a point midway of its ends and is provided with two openings to receive gage blocks C, C', one being disposed on each side of the plane of the plate A. These gage blocks are adjustable in their openings, being held in the required position by binding screws D, D', which pass laterally through the edges of the thickened part $a$. Oblique extensions E projecting from the cap afford means for manipulating the device without injury to the hand. Parallel ribs $e$ on the sides of the plate A travel on the side of the saw blade and prevent the ends of the device from engaging with the teeth when set on moving the gage back and forth on the toothed edge of the saw. These ribs also strengthen the plate A and enable the same being made thin and light. To further lighten the tool the plate A is provided with openings of suitable shape and at convenient points. The edge of the plate opposite the thickened portion $a$ is cut away to give clearance for the teeth and for other manifest purposes.

The swaging of the rakers is done by striking the raker tooth that is being swaged with a hammer in the usual way. When this has been done my instrument is placed on the face of the saw to ascertain or gage the swage, and is moved back and forth, until the raker-tooth will permit the gage-block to pass over it uninterrupted. If the raker is not low enough the gage-block will catch on the raker, and then it is known that the raker has not been swaged enough and it is struck again, following this by placing the device on the face of the saw as before to ascertain if the raker has been swaged enough. If the raker still needs swaging the process is repeated until the raker has been fully swaged to the desired extent.

Having thus described the invention, what is claimed as new is—

1. A gage for cross cut saws comprising a plate having a cap which is thickened at a point between its ends and provided with oblique extensions and gage blocks adjustably held in the said thickened portion, substantially as described.

2. A gage for cross cut saws composed of a plate having parallel ribs on its sides, and having a cap on one edge which is thickened between its ends and provided with oblique extensions, and having the edge of the plate cut away opposite the said thickened portion, and die blocks, one on each side of the plate, adjustably held in the said thickened portion, substantially as described.

In testimony whereof I have signed this specification in the presence of two subscribing witnesses.

JOSEPH MORIN.

Witnesses:
EDW. K. MATLOCK,
GEORGE MORAN.